United States Patent [19]

König et al.

[11] Patent Number: 5,384,306
[45] Date of Patent: Jan. 24, 1995

[54] FINE-PARTICLE OXIDE CERAMIC POWDERS

[75] Inventors: Theo König, Laufenburg-Rotzel; Dietmar Fister, Murg-Niederhof, both of Germany

[73] Assignee: H. C. Starck GmbH and Co., Goslar, Germany

[21] Appl. No.: 53,003

[22] Filed: Apr. 27, 1993

[30] Foreign Application Priority Data

May 4, 1992 [DE] Germany .............. 4214724

[51] Int. Cl.$^6$ .............................. C04B 35/50
[52] U.S. Cl. .................. 501/152; 501/103; 501/127; 501/133
[58] Field of Search .............. 501/84, 94, 103, 127, 501/133, 12, 152, 153, 154

[56] References Cited

U.S. PATENT DOCUMENTS

| | | | |
|---|---|---|---|
| 4,642,207 | 2/1987 | Uda et al. | 264/10 |
| 4,689,075 | 8/1987 | Uda et al. | 75/0.5 B |
| 4,769,064 | 9/1988 | Buss et al. | 75/0.5 B |
| 4,994,107 | 2/1991 | Flagan et al. | 75/367 |

FOREIGN PATENT DOCUMENTS 0151490 8/1985 European Pat. Off. .
0152957 8/1985 European Pat. Off. .
0379910 8/1990 European Pat. Off. .

OTHER PUBLICATIONS

G. W. Elger, D. E. Traut, G. J. Slavens, and S. J. Gerdemann: "Preparation of Submicron Titanium Nitride Powder by Vapor-Phase Reactions," *Metallurgical Transactions B,* Aug. 1989, vol. 20B, pp. 493-497.
Orbit abstract of EP 0 379 910. Jan. 1990.

*Primary Examiner*—Karl Group
*Assistant Examiner*—Chris Gallo
*Attorney, Agent, or Firm*—Connolly & Hutz

[57] ABSTRACT

The invention relates to fine-particle oxide ceramic powders of the metal oxides MeO, where Me=Al, Si, Zr, Hf, Ta, Nb, Mo, W, V, La and/or Y, $Al_2O_3$ being present in the α-phase and $SiO_2$ being present in crystalline form.

13 Claims, 1 Drawing Sheet

FINE-PARTICLE OXIDE CERAMIC POWDERS

This invention relates to fine-particle oxide ceramic powders of the metal oxides MeO, where Me=Al, Si, Zr, Hf, Ta, Nb, Mo, W, V, La and/or Y, $Al_2O_3$ being present in the α-phase and $SiO_2$ being present in crystalline form.

The mechanical properties of components produced by powder ceramic techniques are critically determined by the properties of the starting powders. More particularly, a narrow particle size distribution, high powder purity and the absence of oversize particles or agglomerates have a positive effect on the properties of corresponding components.

There are many known processes for the industrial production of fine metal and ceramic powders.

In addition to purely mechanical size-reducing and grading processes, which have the disadvantage that only powders up to a certain fineness and with a relatively broad particle size distribution can be produced, a large number of processes for deposition from the gas phase have also been proposed.

Due in part to very small energy sources, such as for example, thermal plasmas or laser beams, or where turbulent flames, such as for example a chlorine detonating gas burner, are used, the particle size distribution and particle size of the powders produced cannot be exactly controlled. The reaction conditions normally lead to a broad particle size distribution and to the occurrence of individual particles several times larger in diameter than the average particle size.

It is very difficult, if not impossible, to produce powders having average particle sizes of $<0.5$ μm, as measured by FSSS (and not individual particle sizes), by known industrial powder production processes. In the case of these conventionally produced fine powders, it is not possible in practice to prevent a certain percentage of oversize particles being present in the material to the detriment of the mechanical properties of components produced therefrom. Conventional grinding processes also give a very broad particle size distribution which, in the case of these powders, cannot be significantly narrowed even by sizing steps.

Some known processes for the production of ultrafine powders via the gas phase comprise two stages, the second stage being used to convert the more or less amorphous intermediate product into crystalline form and to remove unwanted secondary products from the reaction.

Instead of a flow-optimized hot wall reactor, other gas-phase processes use a plasma flame or other energy sources, such as laser beams, for the reaction. Disadvantages of these processes are essentially the uncontrollable reaction conditions prevailing in various parts of the reaction zone with very steep temperature gradients and/or turbulent flow conditions. As a result, the powders formed have broad particle size distributions.

Numerous proposals for processes for the production of ultrafine hard material powders have been put forward, but are all attended by disadvantages. Thus, even the process disclosed in U.S. Pat. No. 4,994,107, which describes a tube reactor for the production of uniform non-agglomerated powders, is attended by serious disadvantages in practice. Because all the reactants are mixed before the hot zone, there is no clearly defined beginning to the nucleation reaction. In addition, wall reactions cannot be prevented. Accordingly, there is a greater danger of coarse particles entering the otherwise fine powders from which they can no longer be removed.

EP-A 0 379 910 describes a two-stage process for the production of $Si_3N_4$ from the gas phase, in which the starting halide is injected into the reactor in liquid form through a two-component nozzle. Satisfactory powders cannot be produced by this process either.

Other proposals for the production of very fine uniform powders include reactions under reduced pressure and also various sol-gel processes. These proposals also have disadvantages, including multiple stages, poor controllability of particle size and particle size distribution and batch operation.

The proposed plasma, laser or explosion processes (EP-A 0 152 957, EP-A 0 151 490) also have the disadvantages mentioned above.

The production of fine powders by a specially conducted magnesiothermal reaction of the corresponding metal chlorides for the production of TiN or TiC, for example, also fails to achieve the fineness and uniformity of the powders produced by the proposed process (G. W. Elger, Met. Transactions 20 B, 8, 1989, pages 493-497).

The processes disclosed in U.S. Pat. No. 4,642,207, U.S. Pat. No. 4,689,075, EP-A 152 957 and EP-A 151 490, which relate to the vaporization of metal by arcs or electron beams and the reaction of gaseous reactants in a glow discharge, do not meet the requirements of an economic process for the production of highly uniform and very fine powders.

Fine-particle $Al_2O_3$, which is not present in the α-phase, can be obtained by the sol-gel process while non-crystalline $SiO_2$ can be obtained by chlorination.

In the search for oxide ceramics having improved mechanical, electrical and magnetic properties, there is a demand for increasingly finer oxide ceramic powders.

Ultrafine oxide ceramic powders in the nanometer range can be produced by the noble gas condensation process. However, it is only possible by this process to produce quantities in the milligram range. In addition, the powders obtained by this process do not have a narrow particle size distribution.

Accordingly, the problem addressed by the present invention was to provide powders which would not have any of the described disadvantages of known powders.

Powders which satisfy these requirements have now been found. These powders are the subject of the present invention.

Accordingly, the present invention relates to fine-particle oxide ceramic powders of the metal oxides MeO, where Me=Al, Si, Zr, Hf, Ta, Nb, Mo, W, V, La and/or Y, $Al_2O_3$ being present in the a-phase and $SiO_2$ being present in crystalline form, characterized in that they have a particle size of 1.0 nm to 500 nm and less than 1% of the individual particles deviate by more than 40% from the average particle size and no individual particles deviate by more than 60% from the average particle size.

In a preferred embodiment, less than 1% of the individual particles deviate by more than 20% from the average particle size and no individual particles deviate by more than 50% from the average particle size. In a particularly preferred embodiment, less than 1% of the individual particles deviate by more than 10% from the average particle size and no particles deviate by more than 40% from the average particle size.

The powders according to the invention preferably have particle sizes in the range from 1 to less than 100 nm and most preferably in the range from 1 to 50 am.

According to the invention, preferred powders are $ZrO_2$ or $\alpha\text{-}Al_2O_3$.

The powders according to the invention are highly pure. Thus, the sum total of the impurities is less than 5,000 ppm and preferably less than 1,000 ppm.

In a particularly preferred embodiment, the sum total of their impurities is less than 200 ppm.

The powders according to the invention can be obtained on an industrial scale and, accordingly, are preferably available (i.e., produced) in quantities of more than 1 kg.

The powders according to the invention are obtainable by a process for the production of fine-particle ceramic powders by reaction of corresponding metal compounds and corresponding reactants in the gas phase —CVR—, the metal compound(s) and the other reactants being reacted in the gas phase in a reactor, homogeneously condensed directly from the gas phase in the absence of any wall reactions and subsequently removed from the reaction medium, characterized in that the metal compounds and the reactants are introduced separately from one another into the reactor at at least the reaction temperature. In cases where several metal compounds and/or reactants are to be introduced, the particular gas mixtures should be selected so that no reaction leading to solid reaction products takes place during the heating phase. In a particularly advantageous embodiment, the process is carded out in a tube reactor. It is particularly favorable for the metal compounds, the reactants and the product particles to pass through the reactor under laminar flow conditions.

By separately preheating the process gases to at least the reaction temperature, the nucleation site can be confined. The laminar flow conditions prevailing in the reactor provide for a narrow residence time distribution of the nuclei or particles. A very narrow particle size distribution can be obtained in this way.

Accordingly, the metal compounds and the reactants should preferably be introduced into the reactor in the form of coaxial laminar streams.

However, to ensure that the two coaxial streams are intermixed, a Kármán vortex path of defined intensity and extent is produced by the incorporation of an obstacle in the otherwise strictly laminar flow.

In one embodiment of this process, therefore, the coaxial laminar streams of the metal compound(s) and the reactants are mixed under defined conditions by means of a Kármán vortex path.

In order to prevent deposition of the reactants on the walls of the reactor, for which there is considerable preference in energy terms, the reaction medium is preferably screened off from the reactor wall by a layer of inert gas. This may be done, for example, by introducing an inert gas stream through specially shaped annular gaps in the reactor wall, this inert gas stream keeping to the reactor wall under the Coanda effect. The ceramic powder particles formed in the reactor by homogeneous condensation from the gas phase for typical residence times of 10 to 300 msec leave the reactor together with the gaseous reaction products (for example HCl), the unreacted reactants and the inert gases which are introduced as carrier gas, purging gas and for the purpose of reducing the adsorption of HCl. Yields of up to 100%, based on the metal component, can be obtained by the process according to the invention.

The ceramic powders are then preferably removed at temperatures above the boiling or sublimation temperatures of the metal compounds used, the reactants and/or any by-products inevitably formed during the reaction. The ceramic powders are advantageously removed in a blowback filter. If this filter is operated at high temperatures, for example 600° C., the adsorption of the gases, particularly the non-inert gases, such as HCl, $NH_3$, $TiCl_4$, etc., to the very large surface of the ceramic powders can be minimized. More particularly, the formation of $NH_4Cl$ (>350° C.) is prevented in the production of nitrides.

The remaining troublesome substances adsorbed onto the powder surfaces can be removed in a following vacuum vessel, again preferably at temperatures of the order of 600° C. The final powders should then be discharged from the plant in the absence of air.

According to the invention, preferred metal compounds are one or more metal compounds from the group consisting of $BCl_3$, boric acid esters, boranes, $SiCl_4$, other chlorosilanes, silanes, metal halides, partly hydrogenated metal halides, metal hydrides, metal alcoholates, metal alkyls metal amides, metal azides, metal boranates and metal carbonyls.

Preferred other reactants are one or more of the group consisting of $O_2$, air, water, $N_2O$, $BCl_3$.

From the powders according to the invention nanodisperse or microdisperse (crystalline or amorphous) ceramic powders may be produced, the ceramic powders preferably being oxides of the elements Al, Si, Zr, Hf, V, Nb, Ta, Mo, W, La, Y or combinations thereof.

Ceramic powders having an adjustable particle size of 1 to 3000 nm (3 μm) for an extremely narrow particle size distribution can be produced by this process. The complete absence of particles considerably larger than the average particle size is characteristic of the particles according to the invention.

Further characteristics of the powders include their high purity, their high surface purity and their good reproducibility.

Depending on the particle size and the constituent material, the non-oxidic powders can be highly sensitive to air or pyrophoric. To eliminate this property, the powders may be subjected to a defined surface modification by treatment with gas/vapor mixtures.

Figure 1:
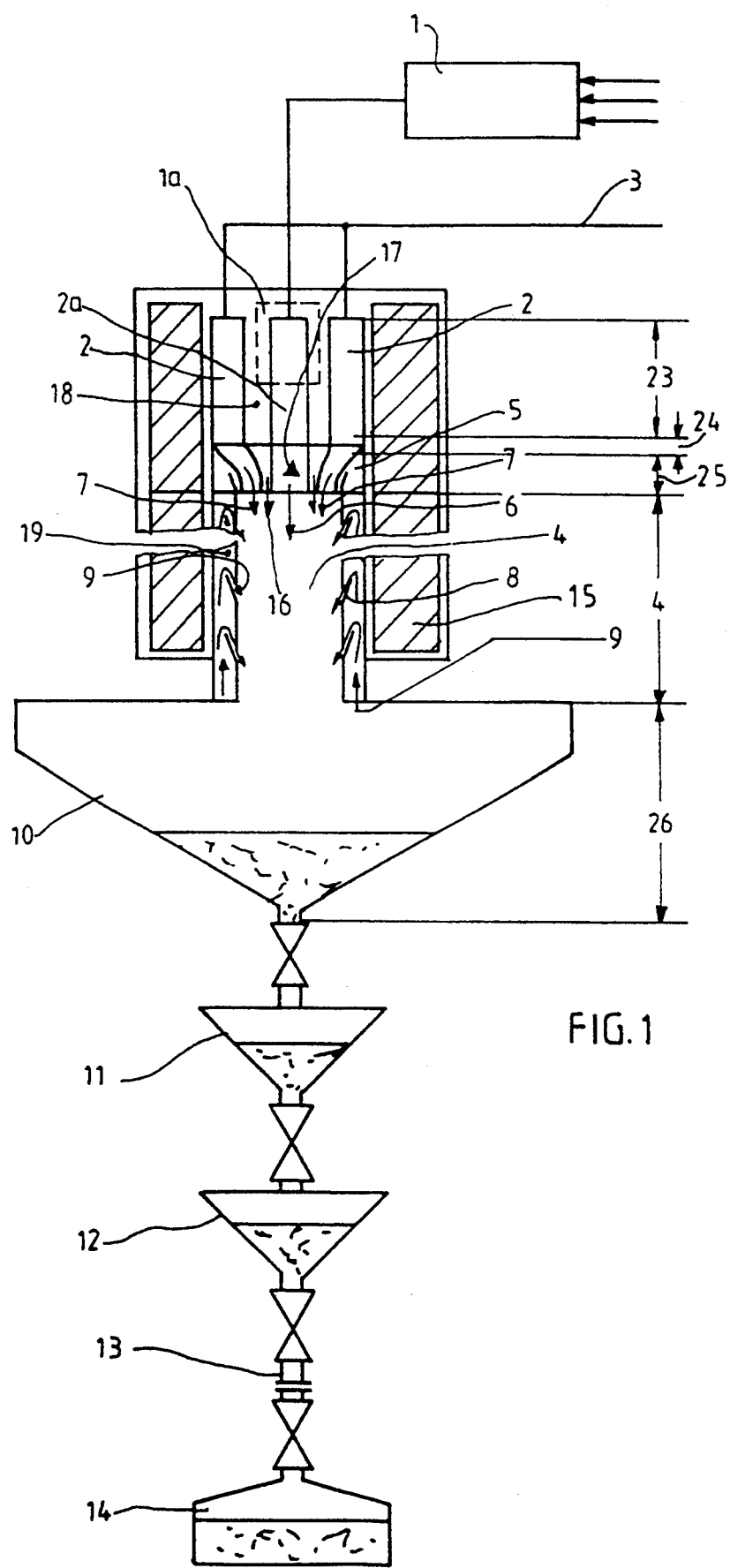
FIG. 1 diagrammatically illustrates an apparatus with which this process can be carried out. The working of the process is described in the following with reference to FIG. 1. The process, material and/or apparatus parameters specifically mentioned are selected from many possibilities and, accordingly, do not limit the invention in any way.

The solid, liquid or gaseous metal compounds are introduced into an externally arranged evaporator (1) or into an evaporator (1a) arranged inside the high-temperature furnace, vaporized therein at temperatures of 200° to 2000° C. and transported into the gas preheater (2a) with an inert carrier gas ($N_2$, Ar or He). The other reactants (3), such as air and/or oxygen, are also heated in a gas preheater (2). Before entering the tube reactor (4), the turbulent individual streams issuing from the gas preheaters (2) are combined in a nozzle (5) into two coaxial, laminar and rotationally symmetrical streams. The middle stream (6) containing the metal component and the surrounding stream (7) containing the other reactants are mixed under defined conditions in the tube reactor (4). The reaction takes place at temperatures of 500° C. to 2000° C., for example in accordance with the following case examples:

$$2M(OCH_3)_3 + 3H_2O \rightarrow Al_2O_3 + (6\ CH_3OH)$$

$$2NbCl_5 + 2\ O_2 \rightarrow Nb_2O_55\ Cl_2\ \text{or}$$

$$ZrCl_4 + O_2 \rightarrow ZrO_2 + 2\ Cl_2N$$

$$ZrCl_4 + 2H_2O \rightarrow ZrO_2 + 4\ HCl$$

To ensure that the two coaxial streams are intermixed, a Kármán vortex path can be produced by incorporation of an obstacle (17) in the otherwise strictly laminar flow. In a preferred embodiment of the present invention, the obstacle (17) is disposed in the flow-shaping part (25), preferably along the longitudinal axis of the central coaxial nozzle (i.e., the nozzle which produces the middle stream (6)). The two coaxial streams are separated at the nozzle outlet by a weak inert gas stream (16) to prevent growths around the nozzle (5).

It is particularly preferred to incorporate the evaporator within the high temperature furnace, for example, within the gas preheater (2a). This avoids the need for feed pipes outside the reactor, thus avoiding corrosion and the resulting impurities. By locating the evaporator within the preheater it is also possible to use non-metal materials for the construction of the evaporator, so that evaporation temperatures can be employed which are higher than the temperatures for which metal materials are designed.

In order to prevent the heterogeneous deposition of these substances on the hot walls of the reactor, for which there is a considerable preference in energy terms, the hot reactor wall is purged through annular gaps (8) with an inert gas stream (9) ($N_2$, Ar or He) which keeps to the reactor wall under the Coanda effect. The ceramic powder particles formed in the reactor by homogeneous condensation from the gas phase leave the reactor together with the gaseous reaction products (for example HCl), the inert gases and the unreacted reactants and pass directly into a blowback filter (10) in which they are deposited. The blowback filter (10) is operated at temperatures of 300° C. to 1000° C., so that adsorption of the gases, more particularly the non-inert gases, such as HCl and $TiCl_4$, to the very large surface of these powders is kept at a low level. In a following vessel (11), residues of the adsorbed gases on the powders are further reduced by preferably alternate application of a vacuum and flooding with various gases at 300° C. to 1000° C. Good results are obtained when such gases as $N_2$, Ar or Kr are used. It is particularly preferred to use $SF_6$.

Metastable systems and core/shell particles can also be produced by this process. Metastable systems are obtained by establishing very high cooling rates in the lower part of the reactor.

Core/shell particles are obtained by introducing additional reaction gases in the lower part of the reactor.

From the vacuum vessel (11), the powders enter the cooling vessel (12) before passing through the lock (13) into the collecting and transport vessel (14). In the cooling vessel (12), the particle surfaces can be subjected to defined surface modification by exposure to various gas/vapor mixtures.

Coated graphite, more particularly fine-particle graphite, is preferably used as the constituent material of those components which are exposed to temperatures of up to 2000° C. and higher, such as the heat exchangers (2) and (2a), the nozzle (5), the reactor (4) and the tube (15) surrounding the reactor. Coating may be necessary, for example, if the necessary chemical stability of the graphite to the gases used, such as metal chlorides, HCl, $N_2$ and $O_2$, at the temperatures prevailing is inadequate or if erosion at relatively high flow rates (0.5 to 50 m/sec.) is very high or if the impermeability of graphite to gases can thus be increased or if the surface roughness of the reactor components can thus be reduced.

For example SiC, $Al_2O_3$, $Ta_2O_3$ and Ni (only up to 1200° C.) may be used for the layers. Combinations of various layers, for example with a "characteristic" outer layer, are also possible. These layers may advantageously be applied by CVD, plasma spraying and electrolysis (Ni).

For the production of the powders according to the invention, oxide ceramic materials are available for these parts. In cases where only low temperatures are required, metallic materials may also be used.

To adjust the particle sizes of the ceramic powders, three measures may simultaneously be applied:
establishing a certain ratio between the reaction gases and inert gases.
establishing a certain pressure.
establishing a certain temperature/residence time profile along the reactor axis.

The temperature/residence time profile is established as follows:
by two or more heating zones from the beginning of the gas preheater (2) to the end of the tube reactor (4).
by varying the cross-section of the reactor along its longitudinal axis.
by varying the gas throughputs and hence—for a predetermined reactor cross-section—the flow rates.

A significant advantage of the variability of the temperature/residence time profile is the possibility of separating the nucleation zone from the nucleus growth zone. Accordingly, it is possible—for the production of "relatively coarse" powders over short residence times at very low temperatures (i.e. small reactor cross-section for a certain length)—to allow the formation of only a few nuclei which can then grow into "coarse" particles over long residence times at high temperatures (large reactor cross-section). "Fine" powders can also be produced: numerous nuclei are formed in a zone of high temperature and relatively long residence time and, further along the reactor, grow only slightly at low temperatures and short residence times (small reactor cross-section). Any transitions between the extreme cases qualitatively illustrated here may also be adjusted.

The powders can be "surface-tailored" in the cooling vessel (12) by exposure to a suitable gas/vapor mixture. The particle surfaces of these ceramic powders may be coated with a layer of defined thickness of suitable organic compounds, such as higher alcohols, amines or even sintering aids, such as paraffins, in an inert carrier gas stream. The powders may also be coated to facilitate their further processing.

By virtue of their mechanical, electrical and magnetic properties, the nano-scale powders according to the invention are suitable for the production of new sensors, actors, cutting ceramics and structural ceramics.

The following Examples are intended to illustrate the invention without limiting it in any way.

EXAMPLE 1

Nb$_2$O$_5$ was produced in accordance with the following reaction equation:

$$2\ NbCl_5 + 2\tfrac{1}{2}\ O_2 \rightarrow Nb_2O_5 + 5\ Cl_2$$

in an apparatus of the type shown in FIG. 1. Air was used in excess as the oxygen carrier.

To this end, 100 g/min. NbCl$_5$ (solid, boiling point 254° C.) were introduced into the evaporator (1a), vaporized and heated to 1250° C. together with 50 N1/min. N$_2$ in the gas preheater (2a). The air was introduced into the gas preheater (2) at 400 N1/min. The reactants were separately preheated to a temperature of approximately 1200° C. Temperature was measured with a W5Re–W26Re thermocouple (18) at the place marked in FIG. 1 (1450° C.). Before entering the reaction tube (4), the turbulent individual streams issuing from the gas preheaters (2) were combined in the outer part of the nozzle (5) into a homogeneous, rotationally symmetrical and laminar annular stream. The gas stream issuing from the gas preheater (2a) was also laminarized in the nozzle (5) and introduced into the annular flow. The nozzle (5) consisted of three component nozzles arranged coaxially of one another. An inert gas stream (16) issued from the middle nozzle and shifted the point where the reaction begins, i.e. where the two streams (6) and (7) are combined, away from the nozzle into the reaction tube. A Kármán vortex path was produced in the inner stream by the obstacle (17) with a characteristic size of 4.0 mm.(arranged in the longitudinal axis of the nozzle). For an overall length of 1100 mm, the reaction tube had an internal diameter of 45 mm at the nozzle outlet and, 200 mm below the nozzle, an internal diameter of 30 mm. After widening to 90 mm (290 mm below the nozzle), the internal diameter at the outlet was 105 mm.

The internal diameter was steadily varied taking the laws of flow into account. The reaction tube (4) was made up of 18 segments joined by spacer and centering tings. Annular gaps (8) were formed at these places.

The nozzle (5), the reaction tube (4) and the heat exchanger (2) were made from oxide ceramic. The heat exchanger (2a) consisted of coated graphite. The large increase in the reactor cross-section is necessary so that the secondary product NbO$_2$Cl can also be converted into Nb$_2$O$_5$ over a long residence time.

The reaction tube (4) was adjusted to a temperature of 1300° C. as measured on the outside wall of the reactor 400 mm below the nozzle with the W5Re–W26Re thermocouple (19). The pressure in the reaction tube (4) was virtually identical with the pressure in the blowback filter (10) which was 250 mbar excess pressure. The reactor wall was purged with 200 N1/min. N$_2$ through 18 annular gaps (8). If the reactor wall is not purged with an inert gas, growths can be formed and, in part, can lead very quickly to blockage of the reactor and hence to termination of the process. In any event, a varying product is obtained on account of the varying geometry of the reactor. To reduce the Cl$_2$ partial pressure, 200 N1/min. nitrogen was introduced into the reaction tube (4) through the 6th annular gap from the bottom by means of an additional gas injector. The product (Nb$_2$O$_5$ with a uniform particle size of ~45 nm) was separated from the gases (Cl$_2$, N$_2$) in the blowback filter (10) at a temperature of 600° C.

This temperature was chosen to keep the primary coating of the very large particle surfaces (42 m$^2$/g) with Cl$_2$ at a low level.

The Nb$_2$O$_5$ thus produced was collected for 40 mins. (i.e. 1950 g) in the blowback filter and was then transferred to the vacuum vessel (11). In this vessel, 8 pumping/flooding cycles with final vacuums of 0.1 mbar absolute were carried out over a period of 35 minutes. The vessel was flooded with Ar to a pressure of 1100 mbar abs. After 35 minutes, the Nb$_2$O$_5$ powder thus treated was transferred to the cooling vessel (12). In this vessel, the powder can also be "surface-tailored" by exposure to various gas/vapor mixtures. After cooling to <50° C., the powder was transferred to the collecting and transport vessel through the lock (13) so that it did not come into contact with the outside air.

For a specific BET surface of 42 m$^2$/g (as measured by the N$_2$-1-point method according to DIN 66 131), corresponding to 45 nm, the Nb$_2$O$_5$ powder showed an extremely narrow particle size distribution.

An SEM micrograph of this Nb$_2$O$_5$ powder with its specific surface of 42 m$^2$/g showed the very narrow distribution of the particle sizes and the absence of oversize particles. According to the micrograph, less than 1% of the individual particles deviate by more than 10% from the average particle size and no individual particles deviate by more than 40% from the average particle size. According to the present state of the art in the field of measurement, reliable information on the particle size distribution of such extremely fine powders can only be obtained by imaging methods (for example SEM, TEM).

Analysis of this Nb$_2$O$_5$ powder showed that the sum total of metallic impurities was 50 ppm.

What is claimed is:

1. Fine-particle oxide ceramic powders of the metal oxides MeO, where

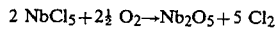

Me = at least one of Al, Si, Zr, Hf, Ta, Nb, Mo, W, V, La and Y, wherein the powders have a particle size of 1.0 nm to 500 nm and less than 1% of the individual particles of said powder deviate by more than 40% from the average particle size and no individual particles of said powder deviate by more than 60% from the average particle size, further wherein any Al$_2$O$_3$ present is in the $\alpha$-phase and any SiO$_2$ present is in crystalline form.

2. Powders as claimed in claim 1, wherein less than 1% of the individual particles deviate by more than 20% from the average particle size and no individual particles deviate by more than 50% from the average particle size.

3. Powders as claimed in claim 1, wherein less than 1% of the individual particles deviate by more than 10% from the average particle size and no individual particles deviate by more than 40% from the average particle size.

4. Powders as claimed in claim 1, wherein the particle size is in the range from 1 to less than 100 nm.

5. Powders as claimed in claim 1, wherein the particle size is in the range from 1 to less than 50 nm.

6. Powders as claimed in claim 1, wherein the metal oxide is $ZrO_2$.

7. Powders as claimed in claim 1, wherein the metal oxide is $\alpha\text{-}Al_2O_3$.

8. Powders as claimed in claim 1, wherein the sum total of impurities is less than 5000 ppm.

9. Powders as claimed in claim 1, wherein the sum total of impurities is less than 1000 ppm.

10. Powders as claimed in claim 1, wherein the sum total of impurities is less than 200 ppm.

11. Powders as claimed in claim 1, wherein the powders are produced in quantities of more than 1 kg.

12. Powders as claimed in claim 1, wherein the metal oxide is $SiO_2$ in crystalline form.

13. Powders as claimed in claim 1, wherein the metal oxide is $Nb_2O_5$.

* * * * *